United States Patent [19]

Braun et al.

[11] Patent Number: 4,600,928

[45] Date of Patent: Jul. 15, 1986

[54] INK JET PRINTING APPARATUS HAVING ULTRASONIC PRINT HEAD CLEANING SYSTEM

[75] Inventors: Hilarion Braun, Xenia; Michael J. Piatt, Enon, both of Ohio

[73] Assignee: Eastman Kodak Company, Rochester, N.Y.

[21] Appl. No.: 722,543

[22] Filed: Apr. 12, 1985

[51] Int. Cl.[4] .............................................. G01D 15/18

[52] U.S. Cl. ....................................... 346/1.1; 346/75; 346/140 R

[58] Field of Search ........................ 346/1.1, 75, 140 R

[56] References Cited

U.S. PATENT DOCUMENTS

| | | | |
|---|---|---|---|
| 4,123,761 | 10/1978 | Kimura et al. | 346/140 R |
| 4,245,224 | 1/1981 | Isayama et al. | 346/75 |
| 4,404,566 | 9/1983 | Clark et al. | 346/1.1 |

*Primary Examiner*—E. A. Goldberg
*Assistant Examiner*—Gerald E. Preston
*Attorney, Agent, or Firm*—John D. Husser

[57] ABSTRACT

Ink jet printing apparatus having a cleaning system whereby ink is supported proximate the droplet orifices, the charge plate and/or the operative catcher surface and ultrasonic cleaning vibrations are imposed on the supported ink mass. Such cleaning can be implemented with ink cross-flowing through the print head cavity and/or in cooperation with a varying pressure differential across the charge plate, which cause ink to oscillate inwardly/outwardly within the orifices.

16 Claims, 5 Drawing Figures

INK JET PRINTING APPARATUS HAVING ULTRASONIC PRINT HEAD CLEANING SYSTEM

BACKGROUND OF THE INVENTION

1. Field of the Invention

The present invention relates to continuous ink jet printing apparatus and more particularly to improved systems (i.e. structural and functional modes) for self-cleaning of the print head assembly of such apparatus.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

In general, continuous ink jet printing apparatus have an ink cavity to which ink is supplied under pressure so as to issue in a stream from an orifice plate that is in liquid communication with the cavity. Periodic perturbations are imposed on the liquid stream (e.g. vibrations by an electromechanical transducer) to cause the stream to break up into uniformly sized and shaped droplets. A charge plate is located proximate the stream break-off point to impart electrical charge in accord with a print information signal and charged.droplets are deflected from their nominal trajectory. In one common binary printing apparatus charged droplets are deflected into a catcher assembly and non-charged droplets proceed along their nominal trajectory to the print medium.

The components described above (particularly the orifice plate and charge plate) must be precisely sized and positioned to achieve accurate droplet placement on the print medium. However, even after such careful manufacture, significant problems are often presented when the apparatus is shut down for extended periods (e.g. overnight). That is, ink residue which remains from previous usage will often dry in the print head during such shut-down periods. If the dried residue is in the orifice plate it can cause crooked jets. If dried ink residue is in the print head cavity it can become dislodged during printing operation and cause blockage of an orifice or a crooked jet. Dried ink residue in other parts of the circulation system can be filtered; however, excessive quantities of such residue necessitates frequent filter maintenance.

Prior art solutions to the residue problems have included (i) purging the ink cavity, orifice plate and charge plates with air upon shut-down of an operational cycle; (ii) providing a nearly instantaneous negative pressure at shut-down to avoid the residue on the lower print head and (iii) introduction of cleaning solution at start-up and or shut-down.

These solutions are all helpful but not without related difficulties or disadvantages. For example, purging the ink system with air and/or a cleaning solution adds considerable complexity to the apparatus as well as necessitating a lengthy flushing period at start-up. The instant shut-down approach requires an extremely fast-actuation solenoid valve and is not completely reliable in constructions where jet-to-electrode clearances are very small.

U.S. application Ser. No. 06/722,551, entitled "Ink Jet Printing Apparatus Having a Wet-Storage System", and filed Apr. 12, 1985, in the name of M. Piatt, discloses a highly useful approach for solving the above-noted problems. This approach provides a unique home station into which the apparatus print head assembly is transported from the operative printing path for wet storage and start-up procedures. The present invention provides further improvements in the approach described in the aforementioned copending application and in particular provides structure and operational modes which effect enhanced cleaning of the ink jet orifice(s) and the cleaning of other operative portions of the lower print head assembly.

The present invention also constitutes an improvement upon the cleaning system disclosed in commonly assigned U.S. application Ser. No. 495,183, entitled "Fluid Jet Printer and Method of Ultrasonic Cleaning", and filed May 16, 1983, now U.S. Pat. No. 4,563,688 in the name of Hilarion Braun, which discloses an ink jet printing apparatus wherein the orifice plate is "self-cleaned" by the imposition of predetermined ultrasonic vibrations.

SUMMARY OF THE INVENTION

Thus, one general objective of the present invention is to provide improved ultrasonic cleaning for operative portions of ink jet printing apparatus. A more particular purpose is to provide structural configurations and functional techniques that facilitate the ultrasonic cleaning of portions of the charge plate and/or catcher structure of the print head assembly as well as enhanced cleaning of the orifice plate structure of such apparatus. The present invention, when employed separately or in combination with other self-cleaning features disclosed in the above-noted applications, provides significant advantages by obviating more complicated and time consuming cleaning approaches and by providing enhanced apparatus performance.

The above and other objects and advantages are achieved in accord with the present invention by providing for ink jet printing apparatus of the type having: a print head body including an ink cavity, an orifice plate in liquid communication with the ink cavity, and a charge plate located in a spaced relation to the orifice plate, the improvement comprising: means for supporting an ink mass against gravitational forces, in contact with both the orifices of the orifice plate and the drop charging surface of the charge plate and means for imparting ultrasonic cleaning vibrations to such a supported ink mass.

In one preferred embodiment such ink mass support is provided by capillary forces between the charge plate and an opposing wall member and the ultrasonic vibrations are provided by a stimulating transducer on the print head body and transmitted to the charge plate surface by the supported liquid.

In another aspect the present invention provides ink jet printer apparatus having an improved orifice-cleaning function and structure wherein ultrasonic cleaning vibrations are applied while ink is cross-flowing through the print head. In a preferred embodiment in accord with this aspect, such cleaning vibrations are applied concurrently with a variation of the pressure differential across the orifice plate to effect oscillation of ink into and out of the ink orifices.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
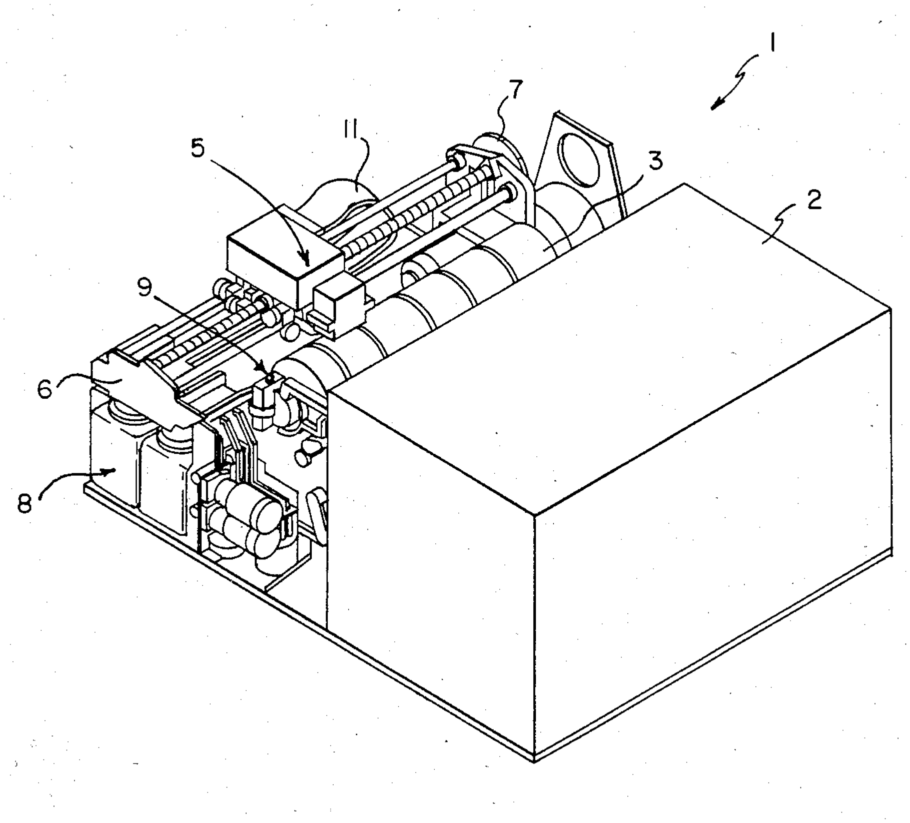
FIG. 1 is a perspective view of one embodiment of ink jet printing apparatus in accord with the present invention.

FIG. 1 illustrates schematically an exemplary ink jet printing apparatus 1 employing one embodiment of the present invention. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 3. Ink is supplied to and returned from the print head assembly by means of flexible conduits 11 which are coupled to ink cartridge(s) 8. A storage and start-up station constructed adjacent the left side (as viewed in FIG. 1) of the operative printing path of print head assembly 5 and the drive means 7 and carriage assembly 6 are constructed to transport the print head assembly into operative relations with station 9 at appropriate sequences of the operative cycle of apparatus 1 as will be described subsequently.

Figure 2:
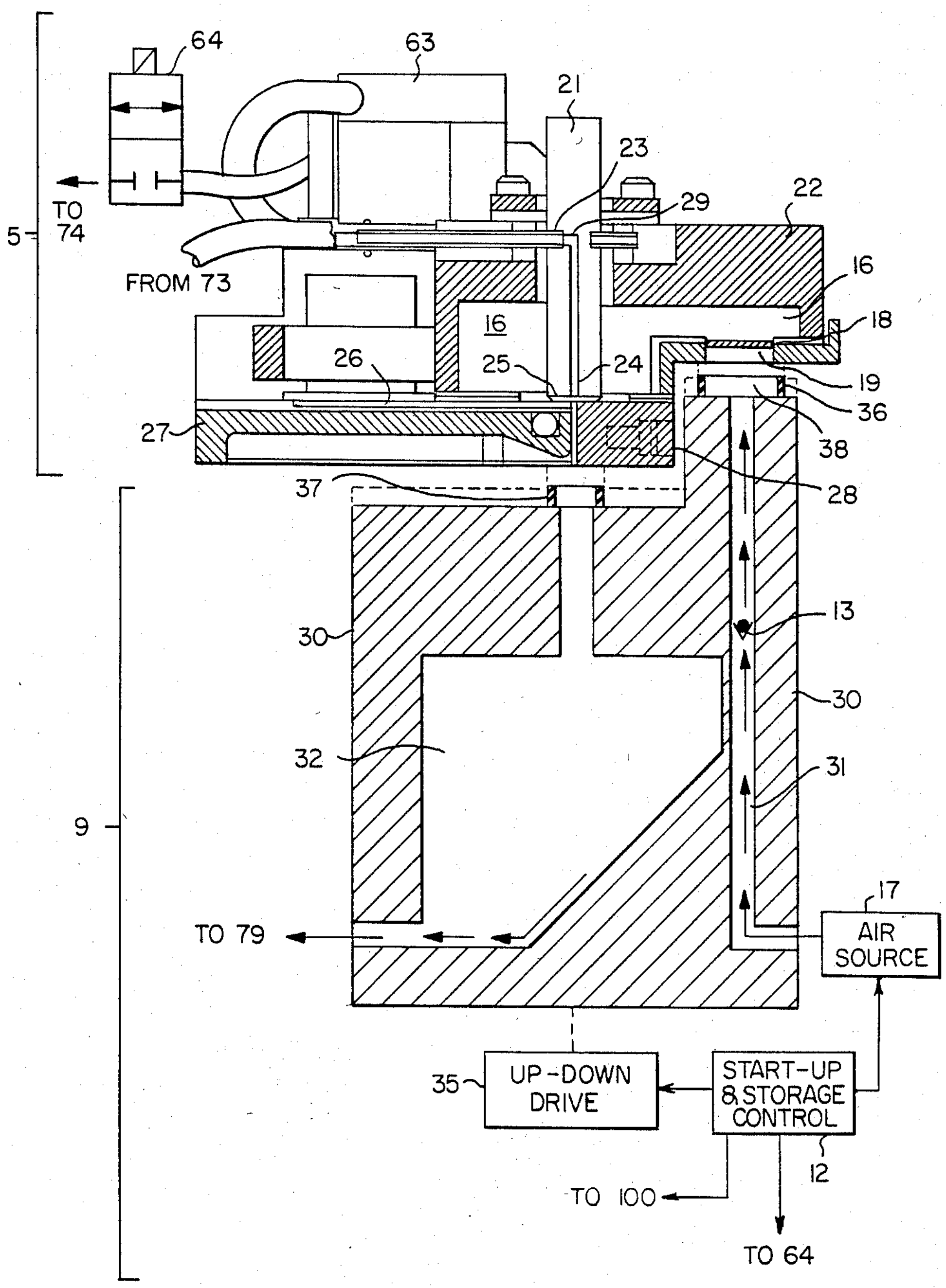
FIG. 2 is a schematic cross-sectional view of a portion of the FIG. 1 apparatus illustrating the upper and lower print head assemblies and their cooperative relation with the storage and start-up station.

Referring briefly to FIG. 2, one embodiment of print head assembly 5 according to the present invention can be seen in more detail. The assembly 5 includes an upper print head portion including a print head body 21 mounted on housing 22 and having an inlet 23 for receiving ink. The body 21 has a passage leading to a print head cavity 24 and an outlet 29 leading from the cavity 24 to the ink circulation system of apparatus 1. The upper print head portion also includes an orifice plate 25 and suitable transducer means for imparting mechanical vibration to the body 21 that is described in more detail subsequently with respect to FIG. 4. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983, now abandoned, further filed as Ser. No. 06/696,682, now U.S. Pat. No. 4,560,991 in the name of W. L. Schutrum and in U.S. Pat. No. 4.223,321; however, other charge plate constructions are useful in accord with the present invention. Exemplary catcher configurations are described in U.S. Pat. Nos. 3,813,675; 4,035,811 and 4,268,836; again other constructions are useful. Finally, in accord with the present invention, lower print head assembly includes a predeterminedly configured and located wall member 28 which will be described in more detail subsequently.

The ink supply and circulation system of the FIG. 1 apparatus includes various ink conduits (i.e. lines) which form supply and circulation paths. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet to a junction 29 between catcher return line 75 and the main ink return line 76. An ink return line 79 also extends from station 9 back to cartridge 8. A flow restrictor 62 is provided in the head supply line 73 and a solenoid valve 64 adapted to provide a selectively variable impedance to liquid ink flow is located in the head return line 74. An air bleed line 78 extends from main filter 61 back to cartridge 8 and an ink bypass line 77 extends from a juncture with line 73 also back to cartridge 8. As will be clear from the subsequent description, the present invention is not limited to use with the particular ink circulation line arrangement illustrated in FIG. 3. Other elements of the FIG. 3 embodiment, such as ink heater 61, final filter 63, temperature sensor 65 and pressure sensor 66 are not necessary for the practice of the present invention, but can be usefully incorporated with it.

Figure 3:
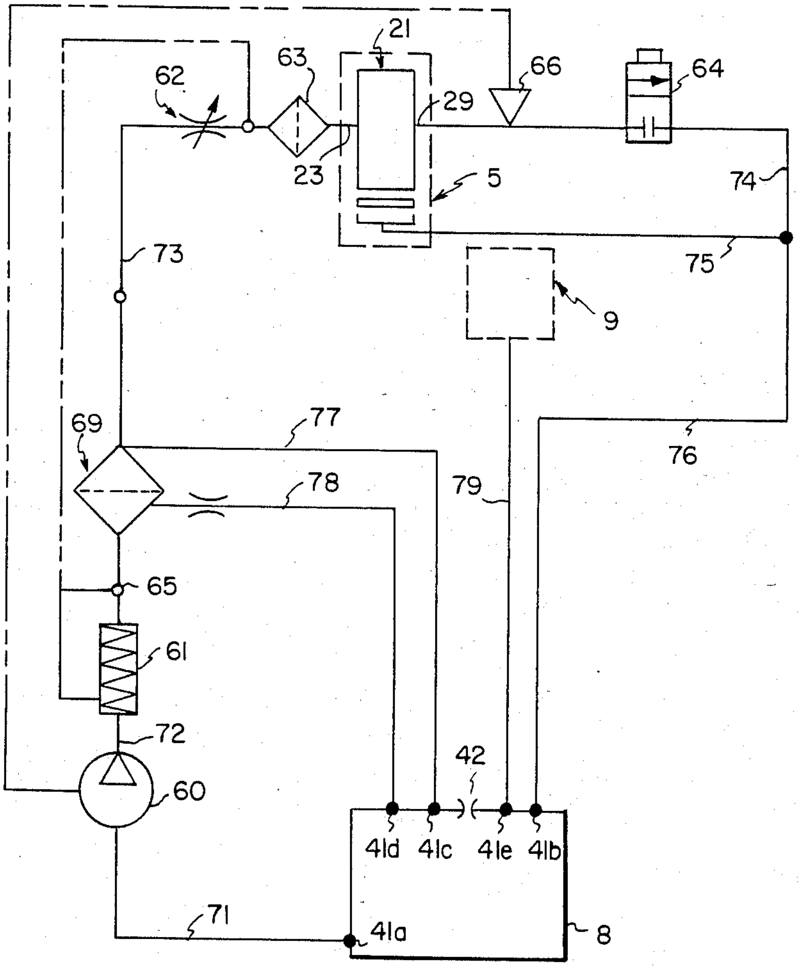
FIG. 3 is a diagrammatic illustration of the ink supply and circulation system of the apparatus shown in FIG. 1.

As shown in FIGS. 1 and 3, cartridge 8 can be in a form that is constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect with lines 71, 76, 77, 78 and 79 upon insertion of the ink cartridge 8 into its mounting in the printer apparatus. Cartridge 8 can have a vent 42 to render the main interior thereof at atmospheric pressure. The cartridge can be constructed with an internal venturi structure which effects return of ink from return line 76 and is disclosed in more detail in concurrently filed U.S. application Ser. No. 06/722,548, entitled "Ink Supply Cartridge and Cooperative Ink Circulation System of Continuous Ink Jet Printer". However, the present invention can function equally well in a circulation system utilizing a separate vacuum pump to withdraw ink from the return lines back to the cartridge.

Referring again to FIG. 2, the storage and start-up station 9 of the present invention comprises a housing 30 having an air supply passage 31 and an ink sump cavity 32 formed therein. The housing 30 is located adjacent the printing path of print head assembly so that the print head assembly can be moved to the cooperative position overlying the housing (as shown in FIG. 2) by the translational drive means 7 (FIG. 1). The housing embodiment shown in FIG. 2 is movable between the dotted-line and solid-line positions (toward and away from the print head assembly), e.g. by up-down drive 35; however, various other arrangements to provide the desired interrelations between the storage and start-up station 9 and print head assembly will occur to one skilled in the art.

As shown in FIG. 2, the housing 30 includes sealing means 36 and 37 which are constructed and located to seal tne interface regions of the conduit 31 and sump 32 with the print head assembly from the surrounding atmosphere when the housing is in the upper (dotted-line position). The ink sump 32 is aligned to receive ink issuing from the orifice plate and conduct it to return line 79. The air inlet 18 includes an air filter 19, which is adapted to filter air from a pressure source 17 prior to its passage through opening 16 to the orifice and charge plate region of the print head assembly. A ball valve 13 is biased to a normally closed position in air conduit 31 and is actuated to an open position by the pressure of the air from source 17 when the air source is on.

The transducer on body 21 can take various forms known in the art for producing periodic perturbations of the ink filament(s) issuing from the orifice plate 25 to assure formation break-up of the ink filaments into streams of uniformly spaced ink droplets. One preferred kind of construction for the print head body and transducer is disclosed in U.S. application Ser. No. 390,105, entitled "Fluid Jet Print Head" and filed June 21, 1982 in the name of Hilarion Braun; however, a variety of other constructions are useful in accord with the present invention.

Figure 4:
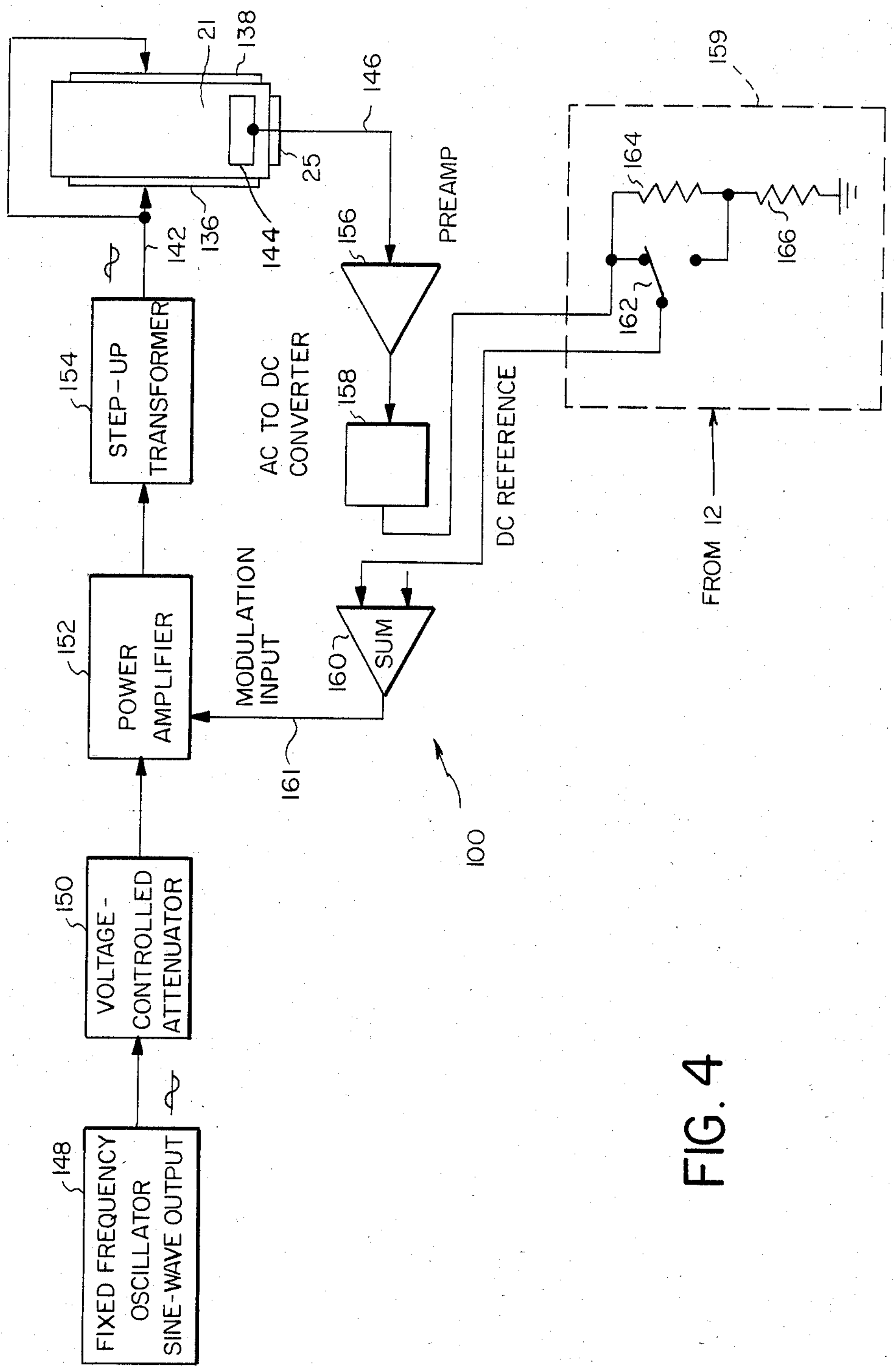
FIG. 4 is a schematic diagram illustrating one preferred embodiment for a vibratory transducer system in accord with the present invention.

An exemplary embodiment of such a transducer system 100 is shown in FIG. 4 employed on elongated print head body 21, the length of which is substantially greater than its other dimensions. The orifice plate 25 is bonded to body 21 which is formed, e.g., of stainless steel, by means of a suitable adhesive. Preferably the conduits attaching to body 21 are selected from among a number of materials, such as a polymeric material, which have a vibrational impedance substantially different from that of the stainless steel body. As a consequence, power loss through the conduits and the resulting damping of the vibrations are minimized.

The body is supported by mounting flanges which are relatively thin and are integrally formed with the body 21. The flanges extend from opposite sides of the elongated print head body and are substantially equidistant from the first and second ends of the body. As a result, the flanges may be used to support the body in a nodal plane and are therefore not subjected to substantial stress.

Transducer means, including thin piezoelectric transducers 136 and 138, are bonded to the exterior of the body of block 2 and extend a substantial distance along the body in the direction of elongation thereof, from adjacent the support means toward both the first and second ends of the body. The transducers 136 and 138 respond to a substantially sinusoidal electrical drive signal, provided by power supply 140 on line 142, by changing dimension, thereby causing mechanical vibration of the body and break up of the fluid streams into streams of drops.

The piezoelectric transducers 136 and 138 have electrically conductive coatings on their outer surfaces, that is the surfaces away from the print head block 21, which define a first electrode for each such transducer. The metallic print head block 21 typically are grounded and thus provide the second electrode for each of the transducers. The piezoelectric transducers are selected such that when driven by an a.c. drive signal, they alternately expand and contract in the direction of elongation of the print head. As may be seen in FIG. 4, transducers 136 and 138 are electrically connected in parallel. The transducers are oriented such that a driving signal on line 142 causes them to elongate and contract in unison. Since the transducers 136 and 138 are bonded to the block 21, they cause the block to elongate and contract, as well.

If desired, an additional piezoelectric transducer 144 may be bonded to one of the narrower sides of the print head to act as a feedback means and to provide an electrical feedback signal on line 146 which fluctuates in correspondence with the elongation and contraction of the print head block 21. The amplitude of the signal on line 146 is proportional to the amplitude of the mechanical vibration of the block 21.

In accord with the present invention, the drive means, which in the printing mode of operation applies the drop stimulation drive signal to the transducer means, is used also to apply a cleaning drive signal, approximating a pulse train, to the transducer means. In the printing mode, the output of a fixed frequency oscillator 148, operating at approximately 75 KHz, is supplied to transducers 136 and 138 via a voltage controlled attenuator circuit 150, a power amplifier 152 and a step-up transformer 154. The output from transducer 144 on line 146 is used to control the amount of attenuation provided by circuit 150. The signal on line 146 is amplified by amplifier 156, converted to a d.c. signal by converter 158, and then supplied to circuit 159 which, during printing operation, passes it directly to summing circuit 160. This signal is compared to a selected reference signal by summing circuit 160 to produce a signal on line 161 which controls the attenuation provided by circuit 150. By this feedback arrangement, the amplitude of the drive signal on line 142 and the amplitude of the mechanical vibration of the print head are precisely controlled. Typically, a substantially sinusoidal drive signal of approximately 3 volts rms is applied to the transducers.

When it is desired for the transducer to operate in a cleaning vibrational mode, to be described below., switch 162 is actuated by start-up and storage control 12 into its lower switching position in which circuit 159 attenuates the output from converter 158 by means of voltage divider formed from resistors 164 and 166. As a result of this attenuation, the summing circuit 160 supplies a control signal to attenuator 150 which causes attenuator 150 to permit a much larger amplitude signal to be applied to power amplifier 152. Amplifier 152 is driven into saturation at the extreme levels of its input, thus resulting in a square wave signal approximating a pulse train being applied to transducers 136 and 138. The square wave is of a substantially greater amplitude than the sinusoidal drive signal. Typically the cleaning drive signal fluctuates between plus and minus 9 volts. It will be appreciated that a square wave signal consists of a number of harmonic signals of higher frequencies. This cleaning drive signal therefore has at least some components which are higher in frequency than the substantially sinusoidal drive signal.

In an alternative preferred embodiment, the control 12 can actuate a cleaning mode of operation wherein the oscillator 148 is varied in frequency to a desired cleaning frequency and the amplitude of the drive signal is increased. Further, the frequency of oscillator 148 can be swept in the cleaning mode until a feedback signal from detector 144 indicates a resonant condition for the system coupled to the transducer vibrations (e.g. the print head plus the charge plate, catcher and support wall surfaces).

The structural and functional details of the apparatus described above will be further understood by the following description of how it operates in accordance with the present invention, under the control of start-up and storage control 12, which can be, e.g. a portion of a microprocessor system (not shown) that controls the overall operation of apparatus 1. Thus, commencing in the course of a printing operation sequence, print head assembly 5 is traversing across the print cylinder and ink is flowing in a plurality of stabilized droplet streams from orifice plate 25, under the influence of the drop stimulator operating in its printing mode. Charge is imparted to droplets by charge plate 26 in accordance with a printing information signal and non-charged drops pass to the print medium, while charged drops are deflected into catcher 27. At this stage valve 64 is closed and ink is circulating from the catcher 27 back to cartridge 8 as described with respect to FIG. 3.

Figure 5:
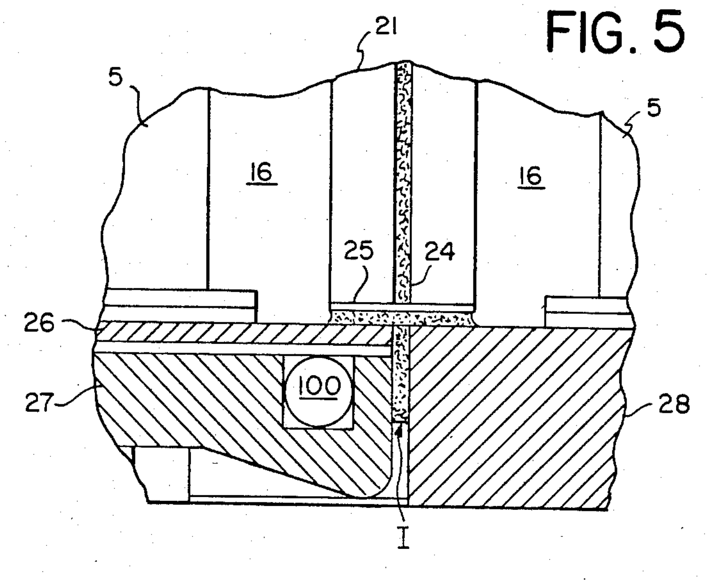
FIG. 5 is an enlarged schematic cross-sectional view of the print head structure of FIG. 2.

When it is desired to change apparatus 1 from a printing or standby condition to a storage condition (e.g. for an overnight period) an appropriate command is transmitted to control 12. In response to this command, control 12 signals drive 7 to translate the print head assembly to the position over the storage and start-up station 9 as shown in FIG. 2 (solid lines), with the charge plate operating in a catch-all-drops mode. The up-down drive 35 is next actuated to move housing 30 into the dotted-line position shown in FIG. 2, whereby the space surrounding print head assembly's orifice and charge plates and catcher are sealed from the atmosphere. Next, valve 64 is opened so that ink flows mainly through the cavity outlet and only weeps through orifice plate 25. The ink which does pass through the orifice plate is transported and held by capillary forces in the region defined by the operative surfaces of the charge and orifice plates 26 and 25 and the opposing surface of wall means 28. FIG. 5 illustrates structural detail of one preferred configuration for supporting ink liquid in contact with charge plate and catcher surfaces for purposes of wet storage and for cleaning in accord with the present invention.

Next the ink supply pump is shut off and it will be appreciated that the operative surfaces of the orifice and charge plate are stored in a wet condition and that the entire fluid system is full of ink rather than air. Also, importantly, the region surrounding operative surfaces of the charge plate orifice plate and catcher are sealed in a high vapor atmosphere so that ink drying is significantly inhibited.

The start-up cycle of apparatus 1, preparatory to recommencing of printing operations, begins with the apparatus in the storage condition just described. Upon receipt of an appropriate start-up command, control 12 actuates pump 60 and heater 61 to circulate and heat ink with valve 64 in an open condition. After the ink has reached proper temperature, valve 64 is closed to an extent that ink is forced through orifice plate 25 in a non-stable condition spraying in all directions and impacting the surfaces of the charge plate 26 and catcher 27. This cleans any dirt that may reside on those surfaces and redissolves any ink which may have dried upon the surfaces.

Now, in accord with one embodiment of the present invention, the valve 64 is once again opened by control 12 to an extent allowing substantial cross-flow through the ink cavity so that the jet flow of ink through the orifices of plate 25 is transformed to a weeping of ink from the orifices into the capillary support zone shown in FIG. 5. In accord with the present invention, the transducer system 100 is now actuated in its ultrasonic cleaning mode by control 12 and the ultrasonic energy is transmitted not only to clean the orifice plate but to the charge plate and liquid-contacted portions of the catcher assembly 27. The FIG. 5 configuration of wall means 28 in relation to the charge plate and orifice plate structures, whereby a liquid ink mass is supported by those cooperative surfaces, assisted by capillary forces, against gravitational forces is a highly preferred mode for effecting requisite ink support. As pointed out in above-noted U.S. application Ser. No. 06/722,551, the rate of opening of valve 64 can be used to control the extend of capillary liquid. However, other configurations for supporting a liquid ink mass so that the ultrasonic energy imparted to the liquid in the print head cavity and orifice plate will be transmitted to the lower print head assembly surfaces (e.g. the charge plate and catcher surfaces) by hydraulic communication, can be utilized and are within the scope of the present invention.

In addition to providing the highly desirable cleaning effects for the charge plate and catcher surfaces, the application of ultrasonic cleaning frequencies with the fluid system in a cross flow (rather than jet stream) mode has been found to have significant advantage for orifice plate cleaning. That is, when ink is cross-flowing through the print head cavity, residue or other particles loosened from the orifice plate interior by the ultrasonic cleaning, will be transported out of the cavity and not re-lodged in the orifices. Thus, another aspect of the present invention, provides the application of the ultrasonic cleaning frequencies to the orifice plate with ink cross-flowing therepast, whether or not the ultrasonic cleaning vibrations are imparted to lower print head surfaces.

A particularly preferred embodiment for implementing this aspect is to employ ultrasonic vibration in cooperation with a varying pressure differential across the orifice plate, which effects oscillation of ink into and out of the orifices. To effect this preferred procedure, the valve 64 is opened to allow the ink to cross-flush through the cavity at a rate that causes only a slight weeping of ink through the orifices of the plate 25 and the air source 17 is actuated (with housing 30 in its upper position) to pressurize the sealed region surrounding the print head assembly. Thus with the housing 30 in the dotted-line position control 12 provides air through conduit 31, air filter 19 and opening 16 into the region below the orifice plate's exterior surface. In this condition the fluid pressure differential across the orifices of plate 25 is in general equilibrium and can be selectively varied by adjustment of the air control and/or valve 64 to alternately urge ink from the exterior side of the orifices to the cavity side of the orifices and from the cavity side to the exterior side. During the oscillation of ink into and out of the orifices, ultrasonic stimulation is effected as described above, and this reversing flow of ink in the orifices has been found highly effective in cooperation with application of ultrasonic vibration in cleaning the orifices, e.g. lifting particles trapped on the cavity side of the orifice plate into a cross-flush flow and out of the ink cavity. Other preferred embodiments for effecting ink oscillation are described in more detail in U.S. application Ser. No.

06/722,494, entitled "Ink Jet Printing Apparatus with Orifice Array Cleaning System" and filed Apr. 12, 1985, in the names of J. McCann, M. Piatt and T. Williams.

A sequence of ultrasonic cleaning of about 10 seconds has been found adequate to effect highly useful cleaning of the orifice and charge plate and the catcher surface in contact with the supported liquid. After this sequence, control 12: (i) actuates up-down drive to a lowered position; (ii) raises the pressure ejecting ink from orifice plate 26 to the nominal pressure, e.g. by further closing of valve 65; and (iii) actuates air source 17 to introduce a pressurized air flow through conduit 31, air filter 19 and opening 16 into the region surrounding the orifice and charge plates. The passage formed by the charging surfaces of the charge plate 26 and the upper portion of opposing wall 28 restricts the air flow from source 17 so that the air velocity through the passage is high and skives away residual ink on the charge plate and catcher. Details of preferred air control are described in concurrently filed U.S. application Ser. No. 06/722,545, entitled "Ink Jet Printing Apparatus Having Improved Start-Up System".

After the charge plate has been dried by the skiving air flow, the air source 17 is shut off, the transducer is actuated and drop charging commences in a catch-all drops mode; the print head assembly is now in the operating condition in which is was moved into the storage and start-up station and is ready to be moved back along the printing path for printing operation.

The invention has been described in detail with particular reference to preferred embodiments thereof, but it will be understood that variations and modifications can be effected within the spirit and scope of the invention. Thus, the procedure of transmitting ultrasonic energy from the print head body to the operative surfaces of the print head assembly by means of a liquid mass can be effected in other stages of an overall start-up procedure, in a sequence of apparatus shut down for storage or in maintenance cycles intervening printing operation of the apparatus. Also, the general structural implementation of this concept can take various forms, e.g., the ultrasonic energy need not be produced by the same transducer as used to stimulate droplet formation. Although the invention has been described with respect to continuous ink jet printing apparatus, those skilled in the art will understand that the concepts of the invention can be employed in other ink jet printing systems, e.g. drop on demand systems.

What is claimed is:

1. In ink jet printing apparatus of the type including a print head assembly including an orifice plate for producing ink droplet streams and a charge plate located in drop charging relation to said orifice plate, the improvement comprising:

(a) means for supporting a liquid mass in contact with both said orifice plate and the drop charging surface of said charge plate; and (b) means providing ultrasonic cleaning vibrations to a liquid mass so supported.

2. The invention defined in claim 1 wherein said apparatus further includes catcher means having a surface extending along the ink droplet path from a location proximate said charge plate and wherein said supporting means also supports such an ink mass in contact with at least a portion of such catcher surface, whereby said cleaning vibrations are transmitted to said catcher surface.

3. The invention defined in claim 1 or 2 further including control means for operating said apparatus to supply an ink mass into said supported condition.

4. In ink jet printing apparatus of the type including a print head body having an ink cavity, an orifice plate in liquid communication with said cavity, an electromechanical transducer for imposing vibrations upon ink in said cavity or said orifice plate, means for supplying ink to said cavity and a charge plate located in drop charging relation to said orifice plate, the improvement comprising:

(a) wall means, located in closely spaced relation to said charge plate and said orifice plate, for forming a capillary support zone wherein an ink mass is supportable, against gravitational forces, in contact with both said orifice plate and the drop charging surface of said charge plate by assistance of capillary forces; and (b) means for actuating said transducer to provide ultrasonic cleaning vibrations to an ink mass so supported.

5. The invention defined in claim 4 wherein said apparatus further includes catcher means having a surface extending along the ink droplet path from a location proximate said charge plate and wherein said wall means also provides capillary force assistance for supporting such an ink mass in contact with at least a portion of such catcher surface, whereby said cleaning vibrations are transmitted to said catcher surface.

6. The invention defined in claim 4 or 5 further including control means for operating said ink supplying means to supply an ink mass into said capillary supported condition.

7. In ink jet printing apparatus of the type including a print head assembly including an orifice plate for producing ink droplet streams and a charge plate located in drop charging relation to said orifice plate, the improvement comprising:

(a) wall means, located in closely spaced relation to said charge plate and said orifice plate, for forming a capillary support zone wherein an ink mass is supportable, against gravitational forces, in contact with both said orifice plate and the drop charging surface of said charge plate by assistance of capillary forces; and (b) means providing ultrasonic cleaning vibrations to an ink mass so supported.

8. The, invention defined in claim 7 wherein said apparatus further includes catcher means having a surface extending along the ink droplet path from a location proximate said charge plate and wherein said wall means also provides capillary force assistance for supporting such an ink mass in contact with at least a portion of such catcher surface, whereby said cleaning vibrations are transmitted to said catcher surface.

9. The invention defined in claim 7 or 8 wherein said print head assembly includes a print head cavity, having an ink inlet and outlet, to which ink is supplied and further including control means for operating said apparatus so that ink is cross-flowing through said print head cavity with an ink mass weeping into said capillary supported condition.

10. A method of cleaning a print head assembly of ink jet printer apparatus, comprising:

(a) supporting an ink mass in contact with both the orifice and charge plates of such assembly; and (b) applying ultrasonic cleaning vibrations to said ink mass.

11. The method of claim 10 wherein the cleaning vibrations are applied by the drop stimulating transducers of said apparatus.

12. The invention defined in claim 10 wherein said ink mass is supported by capillary forces.

13. The invention defined in claim 10 or 12 wherein said ink mass is supported in contact with catcher surfaces of said print head assembly.

14. In ink jet printing apparatus of the type including a print head body having an ink cavity with an inlet and outlet, an orifice plate in liquid communication with said cavity, an electromechanical transducer for imposing vibrations upon ink in said cavity or said orifice plate and means for supplying ink to said cavity inlet, the improvement comprising:

(a) means for operating said apparatus so that ink is cross-flowing through said cavity from said inlet to said outlet;

(b) means for actuating said transducer to provide ultrasonic cleaning vibrations to said orifice plate; and (c) means for oscillating ink inwardly and outwardly within the orifices during operation of said cross-flowing and ultrasonic cleaning means.

15. The invention defined in claim 14 further comprising means for providing a varying pressure differential across said orifices whereby the liquid supported therein oscillates in the inward/outward directions.

16. A method of cleaning the orifice plate of ink jet printer apparatus, comprising:

(a) flowing ink through an ink cavity communicating with said orifice plate;

(b) applying ultrasonic cleaning vibrations to said orifice plate; and (c) applying a varying pressure across said orifice plate to cause ink to oscillate inwardly and outwardly within the orifices.

* * * * *